United States Patent [19]

Tatom et al.

[11] Patent Number: 5,379,025
[45] Date of Patent: Jan. 3, 1995

[54] METHOD AND APPARATUS FOR SEISMIC TORNADO DETECTION

[76] Inventors: Frank B. Tatom, 3062 Dupree Dr., Huntsville, Ala. 35801; Stanley J. Vitton, 4402 Kingdom Ct., Northport, Ala. 35476

[21] Appl. No.: 91,245
[22] Filed: Jul. 12, 1993
[51] Int. Cl.⁶ ............................................. G08B 21/00
[52] U.S. Cl. ................................... 340/601; 340/690; 73/170.16; 73/170.24; 73/DIG. 1; 33/1 HH
[58] Field of Search ............................... 340/601, 690; 73/170.16, 170.24, DIG. 1; 33/1 HH

[56] References Cited

U.S. PATENT DOCUMENTS

| | | | |
|---|---|---|---|
| 4,300,135 | 11/1981 | Korn et al. | 33/1 HH X |
| 4,616,320 | 10/1986 | Kerr et al. | 340/690 X |
| 4,649,524 | 5/1987 | Vance | 340/690 X |
| 4,910,692 | 3/1990 | Outram et al. | 340/690 X |
| 5,101,195 | 3/1992 | Caillat et al. | 340/690 |

Primary Examiner—John K. Peng
Assistant Examiner—Edward Lefkowitz
Attorney, Agent, or Firm—John C. Garvin, Jr.

[57] ABSTRACT

A method and apparatus for detecting the seismic signal generated by a tornado and providing timely warning of the tornado's approach. The invention involves the use of a geophone or velocity transducer (3) to detect the seismic surface waves generated by the tornado. The output of the geophone passes to the microchip (4) installed with the alarm system (5) within the building (6). Within the microchip the signal passes through the A/D converter (7), to the band-pass filter (8), and then to the signal-to-noise comparator (9). When the signal-to-noise ratio exceeds a specified level, the switch (10) is closed and the alarm (5) is activated.

9 Claims, 3 Drawing Sheets

METHOD AND APPARATUS FOR SEISMIC TORNADO DETECTION

TECHNICAL FIELD

The present invention relates generally to providing a warning of an approaching tornado and more specifically to detecting seismic vibrations produced by a tornado, and sounding an alarm to warn the occupants of the building where the invention is installed.

BACKGROUND OF THE INVENTION

The use of Doppler radar to detect wind patterns characteristic of tornadoes is fairly well established. One version of this radar is manufactured by Enterprise Electronics of Enterprise, Ala., but, according to the manufacturer, such radar is not covered by a patent because the original system was developed at the Government's expense. This technique can detect wind patterns at distances in excess of one hundred miles, but it cannot determine whether or not a tornado has touched down.

Another device used in the remote detection of tornadoes is the sferics detector, based on the correlation between storm severity and the rate of high-frequency electromagnetic emissions, as disclosed in the following U.S. Pat. Nos.: 3,810,137 to Bacon and Bacon, and 4,812,825 to Kennedy and Fredrich. Such a system has been shown capable of detecting 80% of the tornadoes within a 70-km radius, but unfortunately it is characterized by an unacceptably high false alarm rate.

Several devices have been developed for use by the homeowner for short-range tornado detection. The first is a battery-powered tornado alarm designed to sense the rapid drop in atmospheric pressure, which is generally characteristic of tornadoes, as disclosed in the following U.S. Pat. Nos.: 3,594,753 to Elenbans, 3,631,435 to Elenbans, 3,717,861 to Wright, and 4,632,052 to Green. Such a detection device is considered inadequate, because only a few seconds elapse between the alarm and tornado passage. One system is available which includes both an electromagnetic sensor and a pressure sensor as disclosed by U.S. Pat. Nos. 3,646,540 to Cooper. Another device, which is called Final Alert, is designed to detect the characteristic roaring sound transmitted through the atmosphere by a tornado. This device is due to be introduced in the near future but is not disclosed by any patent as of Apr.30, 1993. Notice should be taken that it is not clear whether Final Alert can distinguish between a tornado on the ground and a funnel cloud passing overhead.

The ideal detection system would provide the occupants of the building, where the system is installed, with a timely warning of the presence of any tornadoes which are in contact with the ground.

The considerable kinetic energy contained within a tornado is a generally accepted fact. The magnitude of this energy may vary, depending on the intensity of the tornado. Whenever in contact with the ground, a tornado encounters considerable frictional resistance. In overcoming such resistance and in interacting with the ground through turbulent pressure fluctuations, as depicted in FIG. 1, the tornado transfers a considerable amount of energy into the ground. A significant portion of the energy absorbed by the ground takes the form of seismic waves or vibrations, with the remainder being transformed into thermal energy. Seismic waves are generally classified as either body waves or surface waves, depending on the region through which they propagate. Such waves may also be classified according to the direction of displacement relative to the direction of propagation. Waves whose displacement is parallel to the direction of propagation are classified as longitudinal, compressional, or P (for primary) waves. Waves whose displacement is perpendicular to the direction of propagation are classified as transverse or S (for secondary or shear) waves. S-waves are further divided into SV (for vertical shear) waves and SH (for horizontal shear) waves.

For the invention only surface waves are of interest. Surface waves generally are divided into Love waves, which are SH type waves, and Rayleigh waves, which are a combination of P type and SV type waves. Because of the nature of the earth's surface the Love waves should be insignificant, and thus the Rayleigh waves are the primary seismic signal generated by tornadoes. The P-type Rayleigh wave is also referred to as the horizontal component of the Rayleigh wave, while the SV-type Rayleigh wave is referred to as the vertical component of the Rayleigh wave.

The inventors, based on theoretical considerations, combined with an examination of seismic recordings and eyewitness accounts, initially established the existence of tornado seismic vibrations (TSV) composed of Rayleigh waves, which propagate radially outward from the tornado through the earth's surface layer. TSV represent a unique means of determining when a tornado is in contact with the ground. Because tornadoes, when on the ground, represent a significant potential for loss of life and property, the vibrations noted represent a tornado seismic signal (TSS) which, if detected, can be used to provide a warning of approaching tornadoes. The minimum range for detection is estimated to be one mile.

Because the inventor's research indicated no system for accomplishing the object of the invention was then available, they set out to develop a system for performing this object. The inventors wanted to utilize the seismic vibrations produced by a tornado as the warning signal. They therefore included a velocity transducer or geophone as part of the system. Such devices are used to detect seismic vibrations produced by explosions, as well as by ground transportation equipment and other sources. No use of these devices to detect seismic signals generated by tornadoes has ever been reported.

SUMMARY OF THE INVENTION

The invention, which is designated by the abbreviation STD (Seismic Tornado Detector), relates to both the method and apparatus for detecting and providing a timely warning of approaching tornadoes on the ground.

The STD equipment, includes a velocity transducer or geophone, connected to a microchip, which in turn is connected to an alarm. The geophone detects seismic surface waves. The microchip contains an analog-to-digital (A/D) converter, a band-pass filter, a signal-to-noise comparator, and a switch. The alarm, when activated, provides an audio signal, which warns the occupants of the building within which the STD is installed.

DETAILED DESCRIPTION OF THE INVENTION

Figure 1:
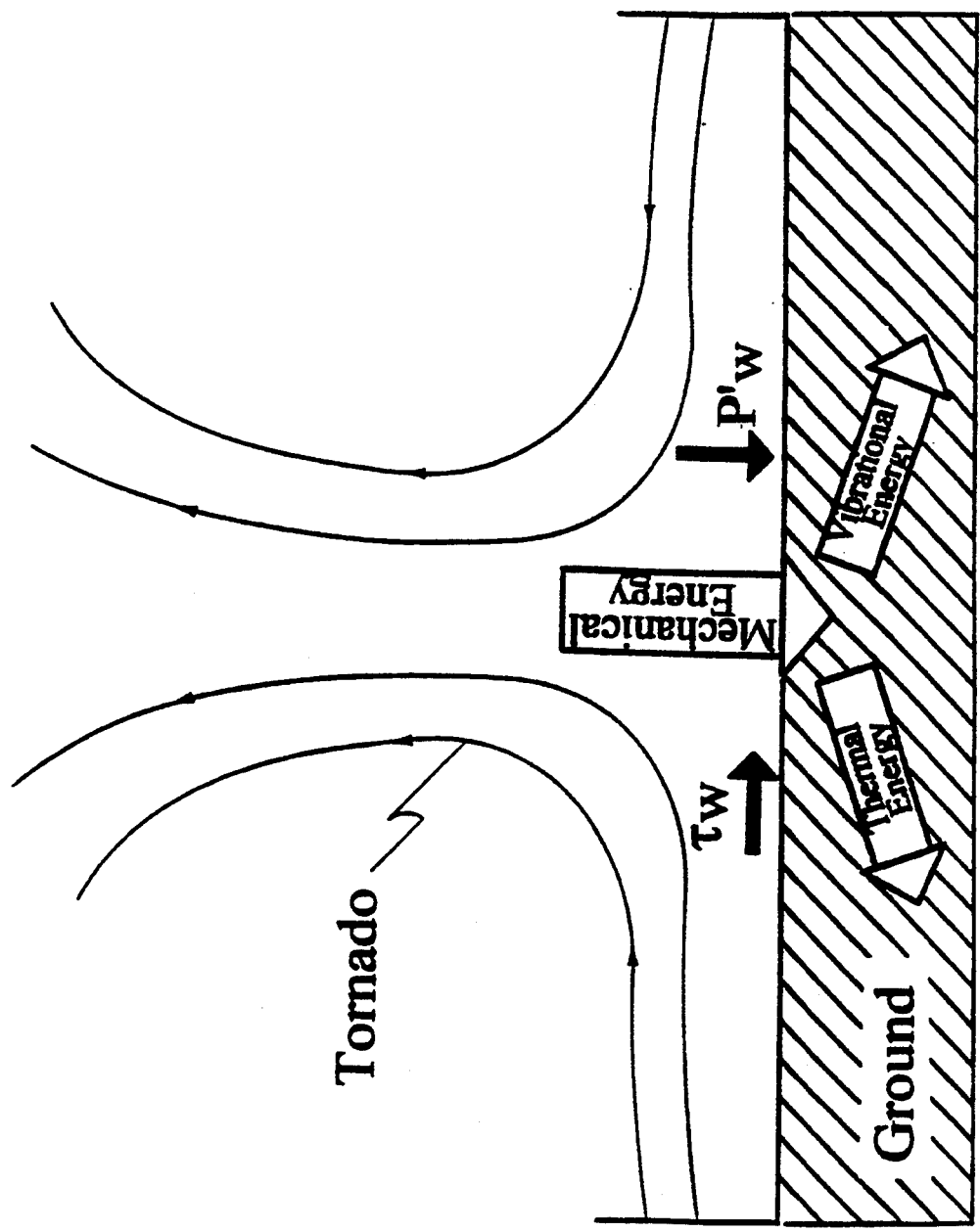
FIG. 1 is a diagrammatic illustration of a typical tornado—ground interaction wherein $P'_w$ indicates turbulent pressure fluctuations and T indicates turbulent shear stress.
Figure 2:
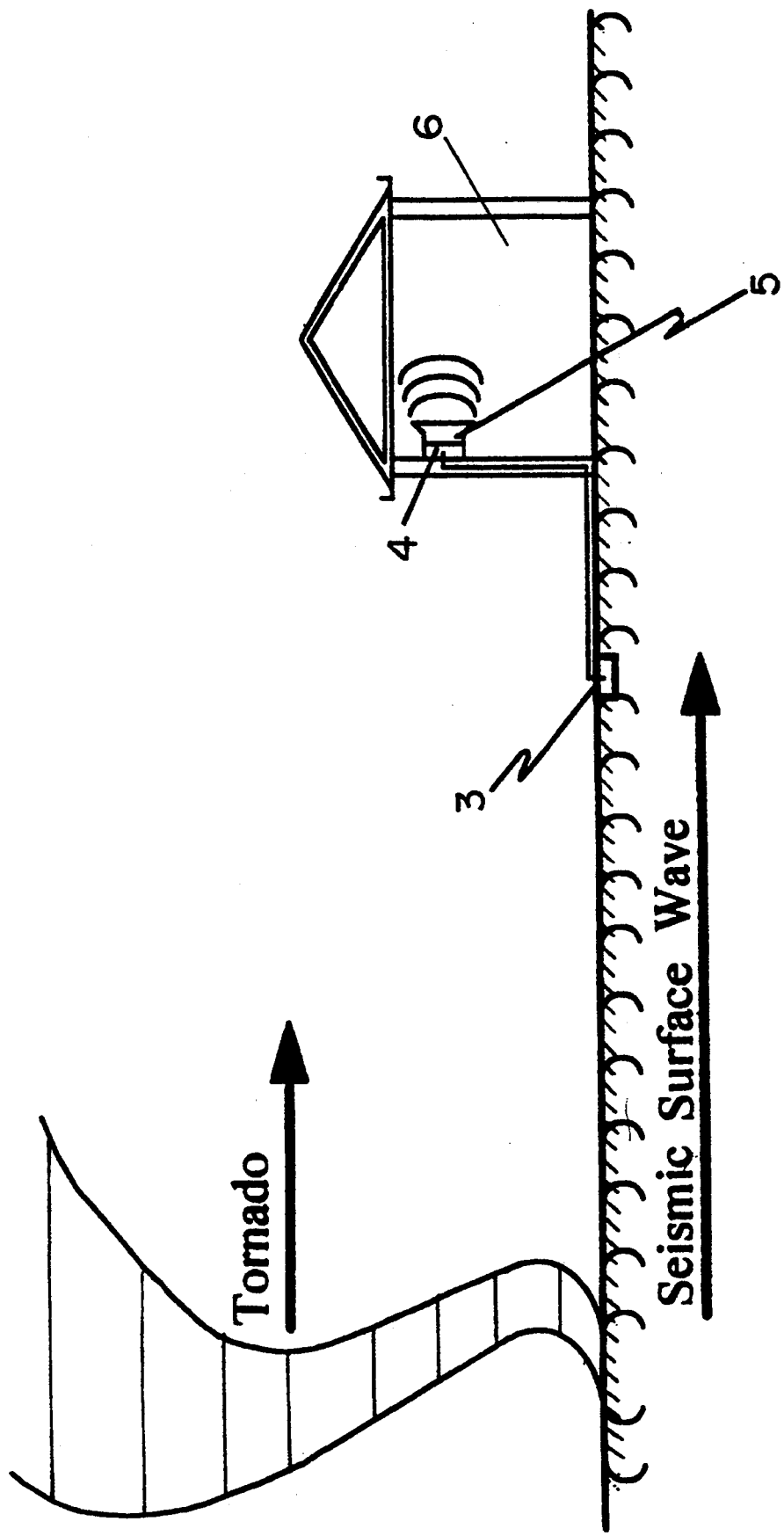
FIG. 2 is a diagrammatic illustration of the warning system of the present invention is conjunction with a building which is in the path of a tornado.

FIG. 2 depicts the invention installed in a building which is in the path of a tornado. The commercially available velocity transducer or geophone 3, such as Mark Products Model L-10, is placed in direct contact with the ground or, preferably, buried in the ground at a depth of less than one foot and is designed to detect surface seismic waves from a variety of sources. The detection range for tornadoes is estimated to be one mile. The velocity transducer is activated when a seismic signal is received greater than a preset threshold, in which case a signal is sent to the microchip installed in the building.

Figure 3:
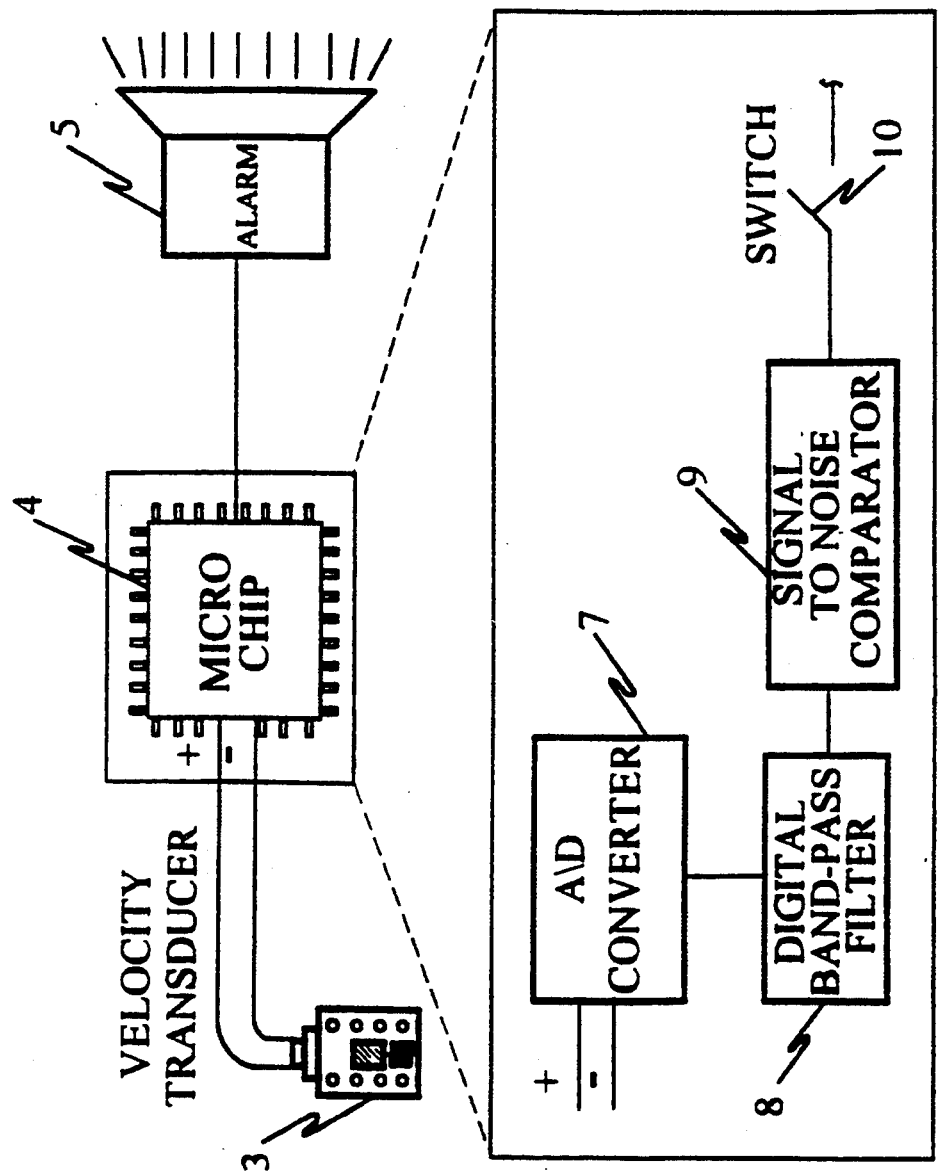
FIG. 3 is a block diagram of the warning system of the present invention illustrating various elements of the system and their interconnections.

As shown in FIG. 3, within a microchip 4 the signal from the transducer passes through an A/D converter 8. The output of the converter passes through a filter 8 which screens out signals which are of a non-tornadic origin, such as due to blasting, ground transportation systems, or lightning strikes. The filter is a digital bandpass filter with a frequency band from substantially 5 to 60 hz involving a specific impulse response function. Such filters are well known in the art. Two typical band-pass filters are respectively disclosed on pages 211 and 217 and on page 239 of the book "Digital Signal Processing" by Alan V. Oppenheim et al. and published by Prentice Hall (1975). The output of the filter passes through a signal-to-noise comparator 9 which compares the magnitude of the filtered signal with a noise threshold magnitude.

If the signal-to-noise ratio exceeds a predetermined value, which is designed to keep the false alarm rate below 10%, a signal is generated by the comparator and sent to a switch 10 which is closed in a manner well known in the art. One such switch is described on pages 310-312 "Microelectric Circuits" by Adel S. Sedra et al. and published by Holt, Rinehart and Wineton (Second Edition) and the switch 10 then directs the signal from the comparator to a commercially available alarms, such as Edmund Scientific Model K39, 094, for activation thereof. Based on known characteristics of tornado the minimum warning time provided by the invention should be one to two minutes.

Although the invention is not capable of detecting tornadoes at so great a range as Doppler radar, it is the only known method for detecting when a tornado is in contact with ground. The warning time that it provides is sufficient to allow the occupants of a building to seek shelter in the safest location within the building in which the invention is installed.

From the foregoing it will be apparent that the present invention provides a method and apparatus for detecting the seismic vibrations produced by a tornado in contact with the ground. Furthermore, the invention can discriminate between the seismic signal produced by a tornado and seismic signals produced by other sources such as blasting, ground transportation systems, and lightning strikes. Thus, the warning generated by the invention will be generally interpreted as a legitimate sign of imminent danger, requiring immediate action.

Although the invention has been disclosed herein as being a method and apparatus to provide a warning of an approaching tornado to the occupants of a building in which the invention is installed, there are also alternative uses of this invention. Two alternative uses of the method and apparatus disclosed herein, which fall within the scope of this invention, are as follows:

1. Method and apparatus for providing a warning of an approaching tornado to the occupants of a number of buildings near a central point of installation of the invention.
2. Method and apparatus for providing a warning of an approaching tornado to the residents of a geographical region within which a network of the inventions is installed.

What is claimed is:

1. A method of providing warning signals of an approaching tornado, comprising:

locating a velocity transducer in direct contact with the ground to detect seismic waves including surface waves of predetermined frequencies produced in the ground as a result of an approaching tornado, said transducer disposed for generating electrical signals indicative of said seismic waves including said surface waves of predetermined frequencies which are produced in the ground as a result of an approaching tornado;

providing a band-pass filter remotely from said velocity transducer, said band-pass filter disposed for receiving said electrical signals from said velocity transducer indicative of said seismic waves, and, for attenuating substantially all of the said electrical signals except said electrical signals indicative of said surface waves produced in the ground as a result of an approaching tornado, said electrical signals indicative of said surface waves produced in the ground as a result of an approaching tornado having a signal-to-noise ratio;

comparing said signal-to-noise ratio of said signals indicative of said surface waves produced in the ground as a result of an approaching tornado to a predetermined level; and activating an alarm when said signal-to-noise ratio exceeds a predetermined level.

2. The method of claim 1 including the step of converting said electrical signals from said velocity transducer into digital signals and directing said digital signals to said band-pass filter, said band-pass filter being a digital band-pass filter disposed for receiving said digital signals.

3. The method of claim 2 wherein said velocity transducer is located a predetermined distance below the surface of the ground.

4. The method of claim 3 wherein said predetermined distance is not more than one foot below the ground surface.

5. The method of claim 4 wherein said predetermined frequencies are in the 5–60 hz range.

6. A tornado warning system having means for monitoring seismic surface waves of a predetermined frequency range, said seismic surface waves being associated with and produced in the ground as a result of an approaching tornado, said warning system comprising:

a velocity transducer mounted in direct contact with the ground to receive seismic waves including said seismic surface waves produced in the ground as a result of an approaching tornado, said transducer disposed for providing electrical signals indicative of and responsive to said seismic surface waves;

band-pass filter means for receiving said electrical signals from said velocity transducer and for attenuating said electrical signals which are not indicative of said surface waves produced in the ground as a result of an approaching tornado, while passing said electrical signals indicative of said surface waves of a predetermined frequency range which are produced in the ground as a result of an approaching tornado, said passed electrical signals having a signal-to-noise ratio;

a signal-to-noise comparator for comparing the magnitude of said passed electrical signals with a noise threshold magnitude;

an activation switch disposed for activation responsive to said signal-to-noise ratio exceeding said noise threshold magnitude and an alarm device connected to said activation switch, said alarm device being actuated by said activation switch responsive to said noise-to-signal ratio exceeding said predetermined value.

7. Apparatus as in claim 6 including an analog-to-digital converter for receiving said electrical signals from said velocity transducer to provide a digital output.

8. Apparatus as in claim 7 wherein said band-pass filter means is a digital band-pass filter for passing frequencies in the 5–60 hz range.

9. A tornado warning system having means for monitoring seismic surface waves of a predetermined frequency range, said seismic surface waves being associated with and produced in the ground as a result of an approaching tornado, said warning system comprising:

a velocity transducer mounted in direct contact with the ground to receive seismic waves including said seismic surface waves produced in the ground as a result of an approaching tornado, said transducer disposed for providing analog electrical signals indicative of and responsive to said seismic waves;

an analog-to-digital converter for converting said analog electrical signals to digital signals;

digital band-pass filter means for receiving said digital signals from said velocity transducer and for attenuating said digital signals which are not indicative of said surface waves produced in the ground as a result of an approaching tornado, while passing said digital signals indicative of said surface waves of a predetermined frequency range which are produced in the ground as a result of an approaching tornado, said passed digital signals having a signal-to-noise ratio;

a signal-to-noise comparator electrically connected to said digital band-pass filter for comparing the magnitude of said passed digital signals with a noise threshold and for providing an electrical output responsive to the magnitude of said passed digital signals exceeding said noise threshold;

an activation switch electrically connected to said signal-to-noise comparator, said switch being closed responsive to receiving said electrical output signal from said signal-to-noise comparator;

an alarm device connected to said activation switch, said alarm device being actuated by said activation switch responsive to said electrical output from said signal-to-noise ratio of said signal-to-noise comparator exceeding said noise threshold.

* * * * *